(12) United States Patent
Zeng et al.

(10) Patent No.: US 11,790,484 B2
(45) Date of Patent: Oct. 17, 2023

(54) TWO-DIMENSIONAL SCALAR FIELD DATA VISUALIZATION METHOD AND SYSTEM BASED ON COLORMAP OPTIMIZATION

(71) Applicant: SHANDONG UNIVERSITY, Shandong (CN)

(72) Inventors: Qiong Zeng, Jinan (CN); Yunhai Wang, Jinan (CN); Changhe Tu, Jinan (CN); Yi Cao, Jinan (CN); Ivan Viola, Thuwal (SA)

(73) Assignee: SHANDONG UNIVERSITY, Jinan (CN)

( * ) Notice: Subject to any disclaimer, the term of this patent is extended or adjusted under 35 U.S.C. 154(b) by 523 days.

(21) Appl. No.: 17/257,906

(22) PCT Filed: Nov. 6, 2019

(86) PCT No.: PCT/CN2019/115965
§ 371 (c)(1),
(2) Date: Jan. 5, 2021

(87) PCT Pub. No.: WO2020/232985
PCT Pub. Date: Nov. 26, 2020

(65) Prior Publication Data
US 2021/0272235 A1  Sep. 2, 2021

(30) Foreign Application Priority Data
May 21, 2019 (CN) .......................... 201910423962.0

(51) Int. Cl.
*G06T 3/40* (2006.01)
*G06T 7/90* (2017.01)
(52) U.S. Cl.
CPC .............. *G06T 3/4007* (2013.01); *G06T 7/90* (2017.01); *G06T 2207/10024* (2013.01)

(58) Field of Classification Search
CPC ......... G06F 16/26; G06T 3/4007; G06T 7/90; G06T 11/001; G06T 11/206; G06T 2207/10024
See application file for complete search history.

(56) References Cited

U.S. PATENT DOCUMENTS

| 10,212,312 B2 * | 2/2019 | Kimpe ...................... H04N 1/60 |
| 2014/0092120 A1 * | 4/2014 | Demos ...................... H04N 9/67 |
| | | 345/589 |

(Continued)

FOREIGN PATENT DOCUMENTS

CN  110162567 A  8/2019

OTHER PUBLICATIONS

Bernard et al. "A survey and task-based quality assessment of static 2D colormaps." Visualization and Data Analysis 2015. vol. 9397. SPIE, 2015. (Year: 2015).*

(Continued)

*Primary Examiner* — Katrina R Fujita
(74) *Attorney, Agent, or Firm* — Oliff PLC

(57) ABSTRACT

A two-dimensional scalar field data visualization method and system based on colormap optimization including: receiving initial colormap and two-dimensional scalar field input data; calculating key colors in the initial colormap, and setting the key colors as control points; calculating a linear interpolation between pairwise control points using a piecewise linear function, generating and mapping a colormap to the two-dimensional scalar field data; establishing an energy optimization equation for control point coordinate positions and the mapped two-dimensional scalar field data, where the coordinate positions are numerical values between 0 and 1 obtained by normalizing index values in the colormap (Continued)

corresponding to the control points; and solving the energy optimization equation to obtain a control point coordinate position, generating a new colormap using the piecewise linear function and optimized control point coordinate position, and mapping the new colormap to the two-dimensional scalar field data, to obtain a final visualization result.

10 Claims, 7 Drawing Sheets

(56) References Cited

U.S. PATENT DOCUMENTS

| | | | | |
|---|---|---|---|---|
| 2015/0358646 | A1* | 12/2015 | Mertens | H04N 19/44 382/166 |
| 2017/0236290 | A1* | 8/2017 | Sorkine Hornung | G06T 7/162 382/173 |
| 2017/0337708 | A1* | 11/2017 | Bordes | G06T 5/007 |
| 2020/0051319 | A1* | 2/2020 | Wahrenberg | G06T 15/08 |
| 2020/0342684 | A1* | 10/2020 | Kinsella | G06T 19/20 |

OTHER PUBLICATIONS

Bujack et al. "The good, the bad, and the ugly: A theoretical framework for the assessment of continuous colormaps." IEEE transactions on visualization and computer graphics 24.1 (2017): 923-933. (Year: 2017).*

Cheng et al. "Colormap nd: A data-driven approach and tool for mapping multivariate data to color." IEEE transactions on visualization and computer graphics 25.2 (2018): 1361-1377. (Year: 2018).*

Lin et al. "Video stylization: painterly rendering and optimization with content extraction." IEEE transactions on circuits and systems for video technology 23.4 (2012): 577-590. (Year: 2012).*

Liu et al. "Somewhere over the rainbow: An empirical assessment of quantitative colormaps." Proceedings of the 2018 CHI conference on human factors in computing systems. 2018. (Year: 2018).*

Mittelstädt et al. "Colorcat: Guided design of colormaps for combined analysis tasks." Conference on Visualization (EuroVis). 2015. (Year: 2015).*

Padilla et al. "Evaluating the impact of binning 2d scalar fields." IEEE transactions on visualization and computer graphics 23.1 (2016): 431-440. (Year: 2016).*

Reda et al. "Graphical perception of continuous quantitative maps: the effects of spatial frequency and colormap design." Proceedings of the 2018 CHI Conference on Human Factors in Computing Systems. 2018. (Year: 2018).*

Waldin et al. "Personalized 2D color maps." Computers & Graphics 59 (2016): 143-150. (Year: 2016).*

Ware et al. "Measuring and modeling the feature detection threshold functions of colormaps." IEEE transactions on visualization and computer graphics 25.9 (2018): 2777-2790. (Year: 2018).*

Xia et al. "Color consistency correction based on remapping optimization for image stitching." Proceedings of the IEEE international conference on computer vision workshops. 2017. (Year: 2017).*

Zhang; "Data-aware colormap optimization for 2D scalar field visualization;" China Master's Theses Full-Text Database (Electronic Journals); 2019; 57 pages; No. 9.

Zeng et al.; "Data-Driven Colormap Optimization for 2D Scalar Field Visualization;" 2019 IEEE Visualization Conference; 2019; pp. 266-270.

Wang et al.; "Optimizing Color Assignment for Perception of Class Separability in Multiclass Scatterplots;" IEEE Transactions on Visualization and Computer Graphics; 2019; pp. 820-829; vol. 25, No. 1.

Lee et al.; "Perceptually Driven Visibility Optimization for Categorical Data Visualization;" IEEE Transactions on Visualization and Computer Graphics; 2013; pp. 1740-1757; vol. 19, No. 10.

Zhou; "A Survey of Colormaps in Visualization;" IEEE Transaction on Visualization and Computer Graphics; 2016; pp. 2051-2069.

Feb. 28, 2020 Search Report issued International Patent Application No. PCT/CN2019/115965.

Feb. 28, 2020 Written Opinion of the International Patent Application No. PCT/CN2019/115695.

* cited by examiner

TWO-DIMENSIONAL SCALAR FIELD DATA VISUALIZATION METHOD AND SYSTEM BASED ON COLORMAP OPTIMIZATION

BACKGROUND

Technical Field

The present disclosure relates to the technical field of two-dimensional scalar field data visualization, and in particular, to a two-dimensional scalar field data visualization method and system based on colormap optimization.

Related Art

The description in this section merely provides background related to the present disclosure and does not necessarily constitute the prior art.

During implementation of the present disclosure, the inventor finds the following technical problems existing in the prior art.

Two-dimensional scalar data is a common way of data expression in scientific simulation and application, which is of great significance for a scientist to discover the features in the data and distinguish values. In numerous visualization methods for two-dimensional scalar data, colormap mapping is an effective and commonly used method, which refers to a mapping process of assigning a distinguishable color to a quantifiable data value. Different colormaps have great differences in expressing the characteristics of the data. A well-chosen colormap can make the changes contained in the data clearer, and a poorly-chosen colormap may hide the changes in the data. Therefore, choosing a well-tested colormap is a very important and challenging problem for the visualization of two-dimensional scalar field data.

In practice, the scientist often uses some visualization tools to select an existing colormap, and applies the colormap to the data through a color mapping scheme (such as linear mapping). A problem in this process is that the data is often unevenly distributed, and the colormap is often evenly distributed. There is inconsistency between the data and the colormap, which may cause a subtle change of interest by a user in the data to be hidden. In order to reveal potential data features, the scientist usually selects and adjusts the colormap through a trial-and-error process, which is often time-consuming and requires more field experience.

At present, there are numerous quantitative and qualitative guidelines in the field of visualization that can be used for automatic evaluation and design of the colormap. Bujack et al. recently proposes a framework for comprehensive evaluation of the colormap, and in the framework, existing design rules (such as sequence, uniformity, and the like) are classified, and mathematical modelling is performed, which can be further applied to the quantification and automatic selection of the colormap. However, this type of work mainly focuses on the colormap without considering the data. In addition, some scholars in the field propose to adjust control points in the colormap based on statistical metadata or histogram equalization. However, such methods cannot express continuous features within the global data range.

SUMMARY

In order to resolve the problems of the prior art, the present disclosure provides a two-dimensional scalar field data visualization method and system based on colormap optimization.

According to a first aspect, the present disclosure provides a two-dimensional scalar field data visualization method based on colormap optimization.

The two-dimensional scalar field data visualization method based on colormap optimization includes:
receiving an initial colormap and two-dimensional scalar field data that are input;
calculating several key colors in the initial colormap, and setting those key colors as control points;
calculating a linear interpolation between pairwise control points by using a piecewise linear function, to generate a colormap, and mapping the colormap to the two-dimensional scalar field data;
establishing an energy optimization equation for coordinate positions of the control points and the two-dimensional scalar field data for which mapping is performed, where the coordinate positions of the control points are numerical values between 0 and 1 obtained by normalizing index values in the colormap corresponding to the control points; and
solving the energy optimization equation to obtain an optimized coordinate position of the control point, generating a new colormap by using the piecewise linear function and the optimized coordinate position of the control point, and mapping the new colormap to the two-dimensional scalar field data, to obtain a final visualization result.

According to a second aspect, the present disclosure further provides a two-dimensional scalar field data visualization system based on colormap optimization.

The two-dimensional scalar field data visualization system based on colormap optimization includes:
an input module configured to: receive an initial colormap and two-dimensional scalar field data that are input; calculating several key colors in the initial colormap, and set those key colors as control points;
a mapping module configured to calculate a linear interpolation between pairwise control points by using a piecewise linear function, to generate a colormap, and map the colormap to the two-dimensional scalar field data;
an energy optimization equation establishing module configured to establish an energy optimization equation for coordinate positions of the control points and the two-dimensional scalar field data for which mapping is performed, where the coordinate positions of the control points are numerical values between 0 and 1 obtained by normalizing index values in the colormap corresponding to the control points; and
a visualization module configured to solve the energy optimization equation to obtain an optimized coordinate position of the control point, generate a new colormap by using the piecewise linear function and the optimized coordinate position of the control point, and map the new colormap to the two-dimensional scalar field data, to obtain a final visualization result.

According to a third aspect, the present disclosure further provides an electronic device, including a memory, a processor, and a computer instruction stored in the memory and executable on the processor, when the computer instruction is executed by the processor, the steps of the method in the first aspect being completed.

According to a fourth aspect, the present disclosure further provides a computer-readable storage medium configured to store a computer instruction, when the computer instruction is executed by a processor, the steps of the method in the first aspect being completed.

In comparison to the prior art, the present disclosure has the following beneficial effects.

The present disclosure proposes a data-aware-oriented colormap optimization method for two-dimensional scalar field data. By using the optimized colormap, subtle data changes can be highlighted, which has broad application prospects in the field of scientific visualization.

For the two-dimensional scalar data field, the present disclosure proposes, by organically fusing colormap characteristics and data distribution characteristics, a colormap optimization method that can highlight subtle data changes, maintain the original colormap characteristics, and maximize the contrast of the foreground and background, and defines a plurality of interactive exploration methods, which can fully meet the urgent needs for aspects such as colormap design and selection and interactive exploration in the process of scientific data analysis and visualization.

BRIEF DESCRIPTION OF THE DRAWINGS

The accompanying drawings constituting a part of this application are used for providing further understanding for this application. Exemplary embodiments of this application and descriptions thereof are used for explaining this application and do not constitute any inappropriate limitation to this application.

DETAILED DESCRIPTION

It should be noted that, the following detailed descriptions are all exemplary, and are intended to provide further descriptions of this application. Unless otherwise specified, all technical and scientific terms used herein have the same meaning as commonly understood by a person of ordinary skill in the art to which this application belongs.

It should be noted that terms used herein are only for describing specific implementations and are not intended to limit exemplary implementations according to this application. As used herein, the singular form is intended to include the plural form, unless the context clearly indicates otherwise. In addition, it should further be understood that terms "comprise" and/or "include" used in this specification indicate that there are features, steps, operations, devices, components, and/or combinations thereof.

According to Embodiment 1, the present embodiment provides a two-dimensional scalar field data visualization method based on colormap optimization.

Figure 1:
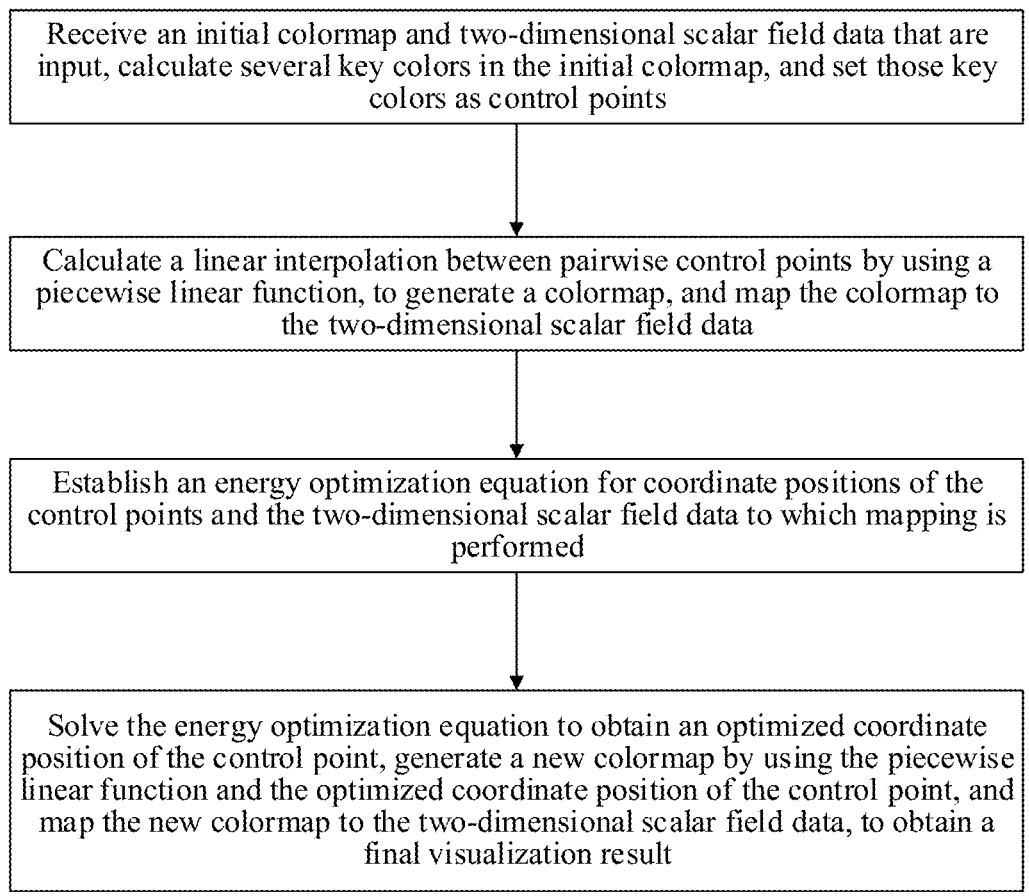
FIG. 1 is a flowchart of the present embodiment.
Figure 2A:
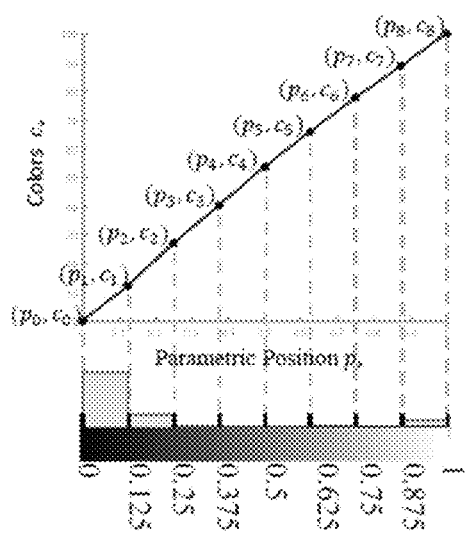
FIG. 2(a) shows an initial grayscale colormap and control points in the colormap.
Figure 2B:
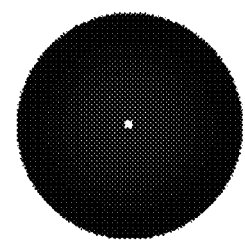
FIG. 2(b) shows color mapping data corresponding to the colormap.
Figure 2C:
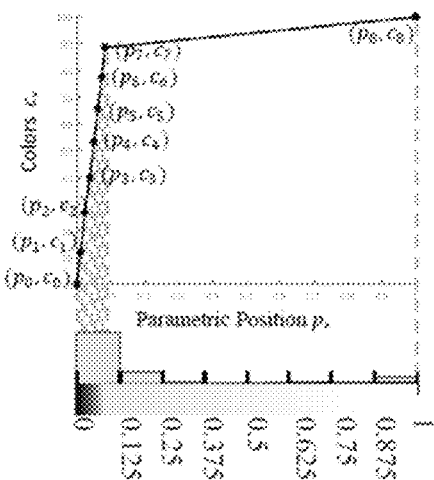
FIG. 2(c) shows a modified grayscale colormap and control points corresponding to the colormap.
Figure 2D:
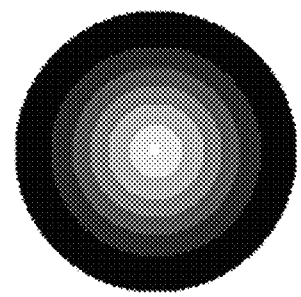
FIG. 2(d) shows color mapping data corresponding to the colormap.

FIG. 1 is a flowchart of the present disclosure. The two-dimensional scalar field data visualization method based on colormap optimization includes:

S1: Receive an initial colormap and two-dimensional scalar field data that are input; calculate key colors in the initial colormap, and set those key colors as control points;

S2: Calculate a linear interpolation between pairwise control points by using a piecewise linear function, to generate a colormap, and mapping the colormap to the two-dimensional scalar field data; for example, the control points shown in FIG. 2(a), FIG. 2(b), FIG. 2(c), and FIG. 2(d).

S3: Establish an energy optimization equation for coordinate positions of the control points and the two-dimensional scalar field data for which mapping is performed, where the coordinate positions of the control points are numerical values between 0 and 1 obtained by normalizing index values in the colormap corresponding to the control points; and S4: Solve the energy optimization equation to obtain an optimized coordinate position of the control point, generate a new colormap by using the piecewise linear function and the optimized coordinate position of the control point, and map the new colormap to the two-dimensional scalar field data, to obtain a final visualization result.

In one or more embodiments, the initial colormap refers to: a user-specified or system default colormap, such as a gray colormap, a rainbow colormap, and the like.

In one or more embodiments, the two-dimensional scalar field data refers to scalar data in a two-dimensional space, such as temperature distribution on the earth grid plane.

In one or more embodiments, the calculating several key colors in the initial colormap, and setting those key colors as control points specifically includes the following steps:

setting a cluster quantity K, and calculating those key colors in the initial colormap by using a clustering algorithm; and using those key colors as the control points, each of the control points including the coordinate position of the control point on the initial colormap and a color corresponding to the control point.

It should be understood that the main color as a control point is specifically expressed as:

$$l=\{(p_1,c_1),(p_2,c_2),\ldots(p_w,c_w)\}; \quad (1)$$

where $p_w$ ($0 \le p_w \le 1$) is a coordinate position of a control point w on the colormap; $c_w$ is a color corresponding to the control point w, and l represents a set of control points.

It should be noted that the optimization algorithm of the present embodiment is only used to adjust the coordinate position of the control point without changing the color of the control point.

In one or more embodiments, the calculating a linear interpolation between pairwise control points by using a piecewise linear function, to generate a colormap, and mapping the colormap to the two-dimensional scalar field data specifically includes the following steps:

$$c = \frac{c_{i+1} - c_i}{p_{i+1} - p_i} \times (p - p_i) + c_i,$$

$$p_i \le p \le p_{i+1}; \quad (2), \text{ where}$$

p represents a coordinate position of a control point; and c represents a color of the control point;

applying the piecewise linear function to any two adjacent control points, to generate a new colormap including a plurality of colors; establishing a mapping relationship between colors and data by using a color mapping process ξ in the new colormap during subsequent application, thereby generating data to which the color is mapped, where the color mapping process is expressed by $f(x; \bar{p})$, p representing the position of the control point, and x representing a value of a data point; and normalizing, by using a maximum and minimum normalization method, any two-dimensional scalar field data to a parameter space of 0 to 1, and establishing a mapping relationship between the colors and the coordinate positions of the control points by using formula (2).

In one or more embodiments, the color mapping process ξ is as follows: assuming that C is used to represent a colormap including n colors, where $C=\{C_1, C_2, \ldots, C_n\}$, $T=\{T_1, T_2, \ldots, T_n\}$, $0 \le T \le 1$ being used to represent numerical values of the two-dimensional scalar field data normalized to 0-1 that are arranged in ascending order, and C being assigned to an element with a same subscript in T.

In one or more embodiments, in specific steps of the establishing an energy optimization equation for coordinate positions of the control points, the energy optimization equation includes a weighted sum of a boundary term, a contrast term, and a fidelity term;

$$\arg \min_{\bar{p}} E(x;\bar{p}) = \alpha B(x;\bar{p}) + \beta F(x;\bar{p}) + \gamma V(x;\bar{p}); \quad (3), \text{ where}$$

x is the two-dimensional scalar field data for which mapping is performed, $\bar{p}$ is a to-be-optimized position of the control point, and α, β, and γ are weight parameters;

E(x; $\bar{p}$) represents the energy optimization equation; B(x; $\bar{p}$) represents the boundary term; F(x; $\bar{p}$) represents the fidelity term; and v(x; $\bar{p}$) represents the contrast term.

FIG. 5(a), FIG. 5(b), FIG. 5(c), and FIG. 5(d) illustrate the influence of different weight factors on the results.

In one or more embodiments, the solving the energy optimization equation to obtain an optimized coordinate position of the control point specifically includes the following steps:

performing sequential quadratic programming to solve the optimization function $\arg \min_{\bar{p}} E(x; \bar{p})$ iteratively, by using the coordinate position of the control point as a variable for optimization solution;

calculating the boundary term, where a function of the boundary term is to guarantee that boundary distribution of color mapping data is consistent with a hidden boundary structure of the two-dimensional scalar field data, and a boundary of the two-dimensional scalar field data refers to a change between different values;

calculating the fidelity term, where a function of the fidelity term is to guarantee a minimum difference between an optimized colormap and an initial colormap; and calculating a foreground-background contrast term, where a function of the contrast term is to guarantee a maximum contrast between a foreground color and a background color of the color mapping data, to enhance identifiability of the foreground data, thereby obtaining the optimized coordinate position of the control point.

In one or more embodiments, the boundary term is defined as:

$$B(x;\bar{p}) = -\Sigma_i^M q(x_i) * \Sigma_{j \in \Omega} \|f(x_i;\bar{p}) - f(x_j;\bar{p})\|^2; \quad (4), \text{ where}$$

B(x; $\bar{p}$) represents the boundary term; and $q(x_i)$ represents a marginal likelihood function of the data point $x_i$; assuming that i is a label of any data point in the two-dimensional scalar field data, $x_i$ represents a numerical value of the data point; Ω represents a neighbor point of the current data point i, and M represents all data points in the two-dimensional scalar field; $f(x_i; \bar{p})$ represents mapping of a parameter value to a color value, for the data point $x_i$ and a set $\bar{p}$ of control point positions, a color mapping equation can be used to obtain a corresponding color value of the data point $x_i$; and $\|\cdot\|$ represents a Euclidean distance.

Figures 3A, 3B:
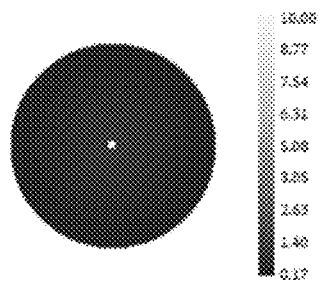
FIG. 3(a) shows an input colormap and corresponding color mapping data.
FIG. 3(b) shows a local difference of input color mapping data.
Figures 3C, 3D:
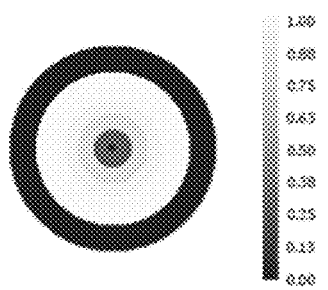
FIG. 3(c) shows a visualization result of a marginal likelihood function.
FIG. 3(d) shows an optimized colormap and corresponding color mapping data.
Figure 3E:
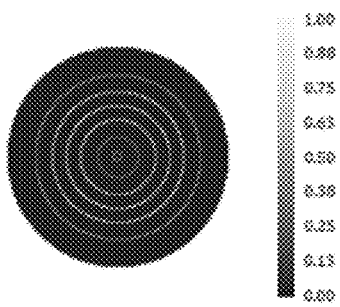
FIG. 3(e) shows a local difference of optimized color mapping data.
Figure 4A:
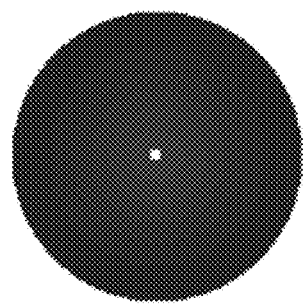
FIG. 4(a) shows an input colormap and corresponding color mapping data.
Figure 4B:
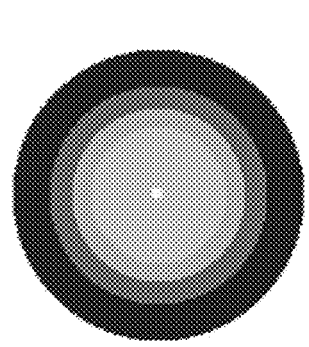
FIG. 4(b) shows an optimized colormap corresponding to $\eta=100$ and corresponding color mapping data.
Figure 4C:
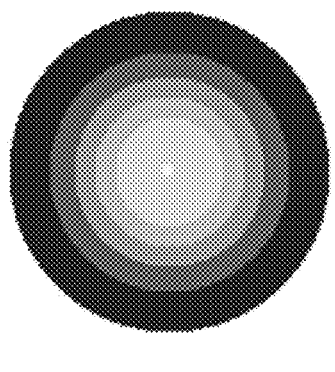
FIG. 4(c) shows an optimized colormap corresponding to $\eta=1$ and corresponding color mapping data.
Figure 4D:
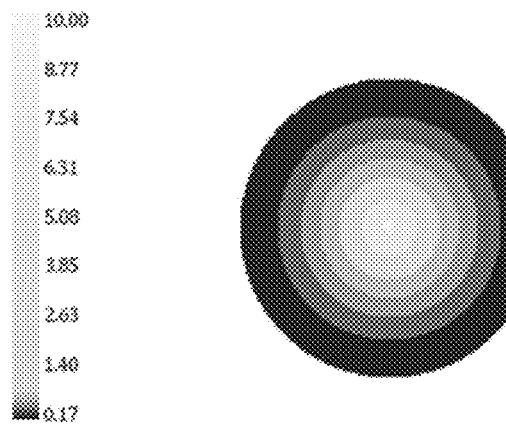
FIG. 4(d) shows an optimized colormap corresponding to $\eta=0.01$ and corresponding color mapping data.
Figure 5A:
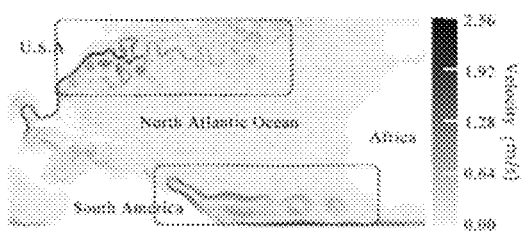
FIG. 5(a) shows an input colormap and corresponding color mapping data.
Figure 5B:
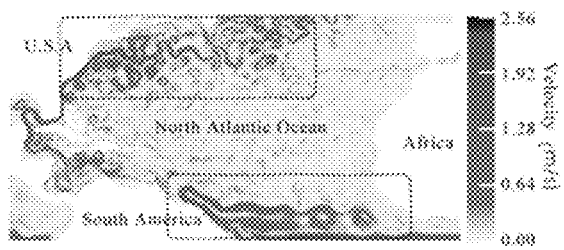
FIG. 5(b) shows an optimized colormap corresponding to $\alpha=1$, $\beta=0$, and $\gamma=0$ and corresponding color mapping data.
Figure 5C:
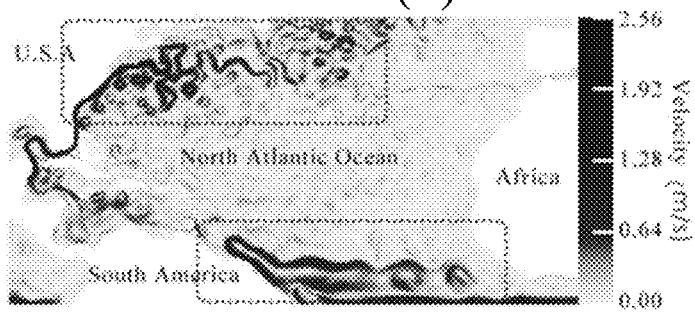
FIG. 5(c) shows an optimized colormap corresponding to $\alpha=0$, $\beta=0$, and $\gamma=1$ and corresponding color mapping data.
Figure 5D:
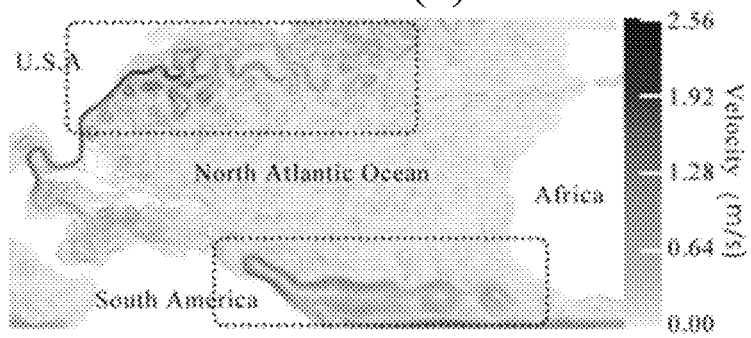
FIG. 5(d) shows an optimized colormap corresponding to $\alpha=1$, $\beta=0.5$, and $\gamma=0.5$ and corresponding color mapping data.

(4-1) For each data point $x_i$ in the two-dimensional data field, the marginal likelihood function of the data point $x_i$ is calculated as below:

$$q(x_i) = e^{-\eta \left| \frac{-\sigma^2 h(x_i)}{g(x_i)} \right|}$$

as shown in FIG. 3(b).

(4-1-1) A parameter a is calculated, where a is a fuzzy parameter of an ideal boundary and is defined as:

$$\sigma \sqrt{e} = \frac{f'(0)}{f''(-\sigma)},$$

where $f'(0)$ represents a maximum value of a first derivative of two-dimensional scalar data, $f''(-\sigma)$ represents a maximum value of a second derivative of the two-dimensional scalar data, the first derivative of the two-dimensional scalar data is calculated by using a gradient operator, and the second derivative of the two-dimensional scalar data is calculated by using a Laplace operator.

(4-1-2) A parameter $h(x_i)$ is calculated, and $h(x_i)$ indicates that the value is equal to an average value of a second derivative of a data point corresponding to $x_i$.

(4-1-3) A parameter $g(x_i)$ is calculated, and $g(x_i)$ indicates that the value is equal to an average value of a first derivative of a data point corresponding to $x_i$.

(4-1-4) A parameter 77 is a boundary weight configured to control the strength of the boundary effect; FIG. 4(a), FIG. 4(b), FIG. 4(c), and FIG. 4(d) illustrate optimization results with different η, as shown in FIG. 3(a), FIG. 3(b), FIG. 3(c), FIG. 3(d), and FIG. 3(e).

(4-2) A color difference between any color mapping data point $x_i$ and a surrounding neighborhood thereof is calculated through an equation $\Sigma_{j \in \Omega} \|f(x_i; \overline{p}) - f(x_j; \overline{p})\|^2$, as shown in FIG. 3(a), FIG. 3(b), FIG. 3(c), FIG. 3(d), and FIG. 3(e).

(4-2-1) For any color mapping data point $x_i$, a neighborhood size is set to $\Omega$.

(4-2-2) For any numerical point in the neighborhood, a difference between a color mapping value of the point and a color mapping value of $x_i$ is solved.

(4-3) An interactive control method for a region of interest by a user is proposed based on the technologies involved in (4-1) and (4-2).

(4-3-1) The user uses the lasso tool to select a region of interest in the data.

(4-3-2) The following formula is used to enhance the marginal likelihood function corresponding to the numerical points in the region of interest selected by the user, where $$B(x; \overline{p}) = -\sum_i^M \omega * q(x_i) * \sum_{j \in \Omega} \|f(x_i; \overline{p}) - f(x_j; \overline{p})\|^2, i \in \Pi$$

ω is a weight of the region of interest.

Figure 6A:
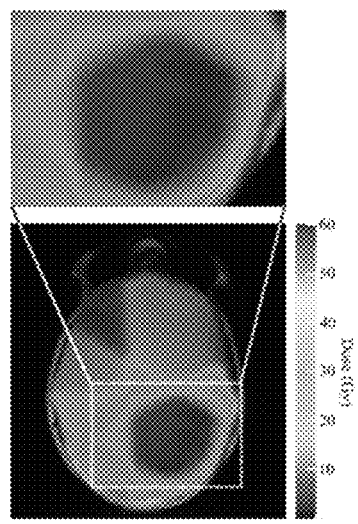
FIG. 6(a) shows an input colormap and corresponding color mapping data, where an enlarged part is visualization of a region of interest by a user.
Figure 6B:
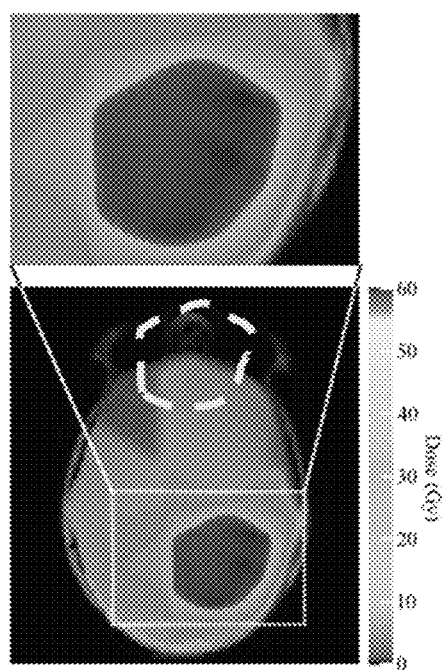
FIG. 6(b) shows a normally optimized colormap and corresponding color mapping data, where on this basis, a user selects a region of interest, as shown by the white dotted line.
Figure 6C:
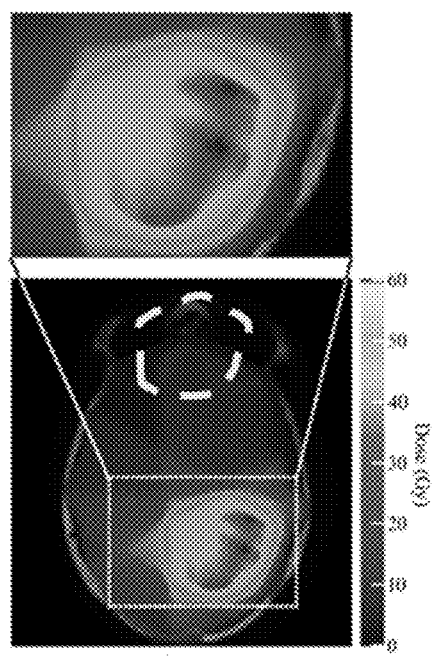
FIG. 6(c) shows an optimization result and corresponding color mapping data of a colormap selected by a user to constrain a region of interest (ROI).

FIG. 6(a), FIG. 6(b), and FIG. 6(c) show application scenarios of the interactive control mode in the field of medical image visualization. The two-dimensional scalar field data of the scenario is head radiation dose data (referred to as "radiation dose data" below) of a brain tumor patient, and the default colormap is a rainbow colormap. In FIG. 6(a), the rainbow colormap is mapped to the radiation dose data, and the generated visualization results are superimposed on a brain CT image with 75% opacity. FIG. 6(b) shows visualization results of the rainbow colormap optimized by using the techniques described in (4-1) and (4-2) and mapped to the radiation dose data. From the visualization results, a doctor observes a great change in a high radiation dose region on the right side of a face of a tumor patient, and then selects the region with the lasso tool to further explore the data information included therein. FIG. 6(c) shows a visualization result of a new rainbow colormap obtained by using the interactive method described in (4-3) to enhance the weight of the selected region and mapped to the radiation dose data.

In one or more embodiments, the fidelity term is defined as:

$$F(x; \overline{p}) = \sum_i^W \|\zeta(\overline{p}_i) - \zeta(p_i)\|^2, \text{ s.t. } 0 < \zeta'(\overline{p}_i) < \epsilon$$

where $\zeta$ is an arc length function corresponding to the initial colormap; $F(x; \overline{p})$ represents the fidelity term; $\zeta(\overline{p}_i)$ represents a numerical value corresponding to the optimized coordinate position of the control point on the arc length function, and $\zeta(\overline{p}_i)$ represents a numerical value corresponding to the coordinate position of an initial control point on the arc length function; and E represents a maximum range of a derivative of the arc length function, which is set to the maximum value of the arc length function by default.

(5-1) The arc length function of the colormap is calculated as follows.

(5-1-1) An initial colormap is mapped to a three-dimensional color space to form a three-dimensional continuous color curve.

(5-1-2) On the color curve, for each control point, an arc length distance from the point to the initial control point is calculated, and the initial control point is several key colors selected from the initial colormap.

(5-1-3) According to the arc length distance from each control point to the initial control point, an arc length function is generated by using a linear interpolation algorithm.

(5-2) A difference between the corresponding values of the control points before and after optimization on the arc length function is calculated by using $\Sigma_i^W \|\zeta(\overline{p}_i) - \zeta(p_i)\|^2$.

(5-3) $\zeta'(\overline{p}_i)$ is a first derivative of the arc length function. By restricting a derivative of the arc length to being greater than 0, the optimized control point coordinates are kept in the same order as the initial control point coordinates.

In one or more embodiments, the contrast term between the foreground and the background is defined as:

$$V(x; \overline{p}) = -\sum_i^M \Delta L(f(x_i; \overline{p}), C_b) * \frac{e^{-d(i,\tilde{i})}}{H(x_i)}$$

where the background refers to unwanted data defined by a user; and a background color is represented by a single color $C_b$.

(6-1) A brightness difference between the foreground color mapping data and the background color is calculated according to the equation $\Delta L(f(x_i; \overline{p}), C_b)$, and $\Delta L(f(x_i; \overline{p}), C_b)$ is only for a brightness channel of a three-dimensional color space.

(6-2) $d(i,\tilde{i})$ in $e^{-d(i,\tilde{i})}$ represents a distance between any numerical point and a closest background point thereto. i represents a certain data point in the two-dimensional scalar data, and $\tilde{i}$ represents the closest point of the data point i found from the background.

(6-2-1) A Euclidean distance between the foreground numerical point and the background numerical point is calculated.

(6-2-2) Distance functions are sorted in descending order, to find the closest background numerical point corresponding to each foreground numerical point.

(6-3) $H(x_i)$ represents a number of data points whose numerical value is equal to $x_i$ in the input data in step S1.

(6-4) The present disclosure extends the technologies in (6-1), (6-2), and (6-3), to enable the technologies to support user interaction operations in the foreground region. Specifically, the user can delete the foreground region of no interest, so that the region of the part will be replaced by the background region. According to the present disclosure, the colormap will be optimized according to the following formula based on the results of user interaction.

$$V(x; \overline{p}) = -\sum_i^M \Delta L(f(x_i; \overline{p}), C_b(\tilde{i})) * \frac{e^{-d(i,\tilde{i})}}{H(x_i)}$$

$C_b(\tilde{i})$ is any background color.

Figure 7:
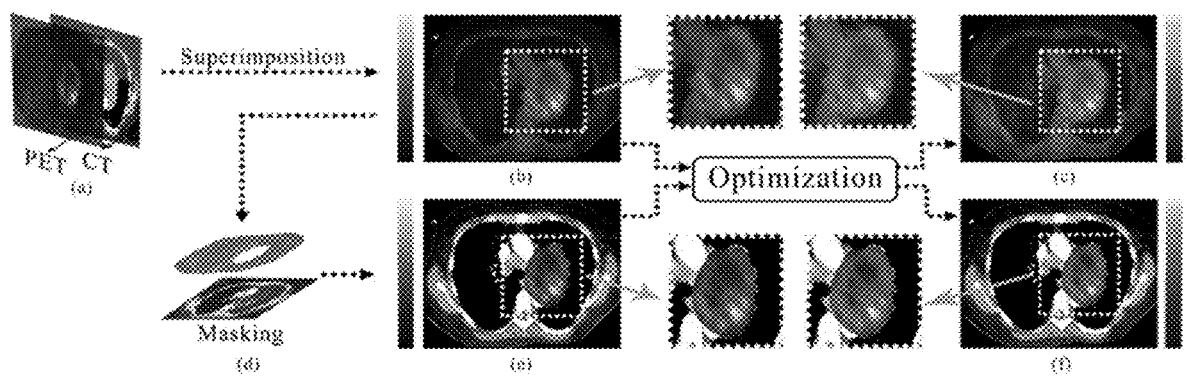
FIG. 7 shows a process of using a background mask tool and a result corresponding to each step.

FIG. 7 shows an application scenario of the interactive control mode in the field of medical image visualization. The two-dimensional scalar field data of the scenario is positron emission tomograph data (referred to as "PET data" below) of a lung tumor patient. A color of an image with a subscript (a) in FIG. 7 is mapped to the PET data, and a process of superimposing the generated visualization result with the chest CT image with 80% opacity is shown. An image with a subscript (b) in FIG. 7 shows the visualization result of the superimposed image with the subscript (a) in FIG. 7, and a result of a corresponding magnified region. An image with a subscript (c) in FIG. 7 shows the visualization result of the rainbow colormap optimized by using the techniques described in (6-1), (6-2), and (6-3) and mapped to the PET data. An image with a subscript (d) in FIG. 7 illustrates a process of removing a part of the foreground of no interest by a user. An image with a subscript (e) in FIG. 7 illustrates a visualization result obtained by superimposing the foreground PET data with the part of no interest removed on the background CT image. Compared with the image with the subscript (c) in FIG. 7, more chest CT images are presented. An image with a subscript (f) in FIG. 7 shows a visualization result of a new colormap obtained through optimization by using the method described in (6-4) for a richer background region and mapped to the PET data.

In one or more embodiments, the generating a new colormap by using the piecewise linear function and the optimized coordinate position of the control point specifically includes the following step:

inputting the optimized coordinate position of the control point into the piecewise linear function, to obtain the new colormap.

The specific technical fields to which the present disclosure can be applied include:

visual analysis of scientific data, visual analysis of medical data, physical simulation, and the like.

The input data of the present disclosure specifically includes: any two-dimensional scalar field data, including but not limited to a two-dimensional surface temperature field, a seawater surface velocity, seawater salinity, a tumor radiation dose, UAV electromagnetic simulation data, and the like.

The present disclosure proposes a colormap mathematical method including a boundary term, a fidelity term, and a contrast term. According to the method, data changes are innovatively introduced into the evaluation and optimization process of the colormap, and constraints on the fidelity of the original colormap and the contrast of the foreground and the background are added. The mathematical expression is highly extensible and easy to extend to add more domain-related prior constraints.

The present disclosure proposes an interactive exploration and optimization method for a region of interest (ROI). Based on the ROI specified by the user, the optimization algorithm will only be used to optimize the region. In addition, an interactive exploration and optimization method based on background replacement is also proposed, which can help the user only pay attention to the changes in the region of interest and the difference between the foreground and the background. The above interactive exploration work is of great significance for scientific data analysis.

The present embodiment proposes a data-aware-oriented optimization algorithm to design a colormap, which is used to highlight continuous features related to data changes in the visualization of a two-dimensional scalar field. The core idea of the present disclosure is an optimization problem of adjusting and transforming the colormap into a nonlinear constraint, to obtain an optimal colormap by iteratively adjusting the parameter positions of the control points in the colormap.

According to Embodiment 2, the present embodiment further provides a two-dimensional scalar field data visualization system based on colormap optimization.

The two-dimensional scalar field data visualization system based on colormap optimization includes:

an input module configured to: receive an initial colormap and two-dimensional scalar field data that are input; calculate several key colors in the initial colormap, and set those key colors as control points;

a mapping module configured to calculate a linear interpolation between pairwise control points by using a piecewise linear function, to generate a colormap, and map the colormap to the two-dimensional scalar field data; for example, the control points shown in FIG. 2(a), FIG. 2(b), FIG. 2(c), and FIG. 2(d).

an energy optimization equation establishing module configured to establish an energy optimization equation for coordinate positions of the control points and the two-dimensional scalar field data for which mapping is performed, where the coordinate positions of the control points are numerical values between 0 and 1 obtained by normalizing index values in the colormap corresponding to the control points; and a visualization module configured to solve the energy optimization equation to obtain an optimized coordinate position of the control point, generate a new colormap by using the piecewise linear function and the optimized coordinate position of the control point, and map the new colormap to the two-dimensional scalar field data, to obtain a final visualization result.

According to Embodiment 3, the present embodiment further provides an electronic device, including a memory, a processor, and a computer instruction stored in the memory and executable on the processor, when the computer instruction is executed by the processor, the operations in the method being completed. For brevity, details are not described herein again.

The electronic device may be a mobile terminal and a non-mobile terminal. The non-mobile terminal includes a desktop computer, and the mobile terminal includes mobile Internet devices such as a smartphone (such as an Android phone, an IOS phones, and the like), smart glasses, a smart watch, a smart bracelet, a tablet computer, a notebook computer, a personal digital assistant, and the like that can perform wireless communication.

It should be understood that in the present disclosure, the processor may be a central processing unit (CPU), or the processor may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

The memory may include a read-only memory (ROM) and a random access memory (RAM), and provide an instruction and data to the processor. A part of the memory may further include a non-volatile random access memory. For example, the memory may further store device type information.

In an implementation process, steps in the foregoing method embodiments can be implemented by using a hardware integrated logical circuit in the processor, or by using an instruction in a form of software. Steps of the method disclosed with reference to the embodiments of the present disclosure may be directly embodied as being performed by a hardware processor or by a combination of hardware in the processor and a software module. The software module may be located in a storage medium that is mature in the art such as a RAM, a flash memory, a ROM, a programmable read-only memory or an electrically erasable programmable memory, or a register. The storage medium is located in the memory, and the processor reads information in the memory and completes the steps in the foregoing methods in combination with hardware of the processor. To avoid repetition, details are not provided again herein. A person of ordinary skill in the art may be aware that, in combination with the examples described in the embodiments disclosed in this specification, units and algorithm steps may be implemented by electronic hardware or a combination of computer software and electronic hardware. Whether the functions are implemented by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

When the functions are implemented in a form of a software functional module and sold or used as an independent product, the functions may be stored in a computer-readable storage medium. Based on such an understanding, the technical solutions of this application essentially, or the part contributing to the prior art, or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely exemplary embodiments of this application, but are not intended to limit this application. This application may include various modifications and changes for a person skilled in the art. Any modification, equivalent replacement, or improvement made without departing from the spirit and principle of this application shall fall within the protection scope of this application.

What is claimed is:

1. A two-dimensional scalar field data visualization method based on colormap optimization, comprising:
   receiving an initial colormap and two-dimensional scalar field data that are input;
   calculating key colors in the initial colormap, and setting those key colors as control points;
   calculating a linear interpolation between pairwise control points by using a piecewise linear function, to generate a colormap, and mapping the colormap to the two-dimensional scalar field data;
   establishing an energy optimization equation for coordinate positions of the control points and the two-dimensional scalar field data for which mapping is performed, wherein the coordinate positions of the control points are numerical values between 0 and 1 obtained by normalizing index values in the colormap corresponding to the control points; and
   solving the energy optimization equation to obtain an optimized coordinate position of the control point, generating a new colormap by using the piecewise linear function and the optimized coordinate position of the control point, and mapping the new colormap to the two-dimensional scalar field data, to obtain a final visualization result.

2. The method according to claim 1, wherein the calculating key colors in the initial colormap, and setting the key colors as control points specifically comprises the following steps:
   setting a cluster quantity K, and calculating the key colors in the initial colormap by using a clustering algorithm; and using the key colors as the control points, each of the control points comprising the coordinate position of the control point on the initial colormap and a color corresponding to the control point.

3. The method according to claim 1, wherein the calculating a linear interpolation between pairwise control points by using a piecewise linear function, to generate a colormap, and mapping the colormap to the two-dimensional scalar field data specifically comprises the following steps:

$$c = \frac{c_{i+1} - c_i}{p_{i+1} - p_i} \times (p - p_i) + c_i,$$

$p_i \le p \le p_{i+1};$ (2), wherein p represents a coordinate position of a control point; and
c represents a color of the control point;
applying the piecewise linear function to any two adjacent control points, to generate a new colormap comprising a plurality of colors; establishing a mapping relationship between colors and data by using a color mapping process $\xi$ in the new colormap during subsequent application, thereby generating data to which the color is mapped, wherein the color mapping process is expressed by f(x; $\bar{p}$), p representing the position of the control point, and x representing a value of a data point; and
normalizing, by using a maximum and minimum normalization method, any two-dimensional scalar field data to a parameter space of 0 to 1, and establishing a mapping relationship between the colors and the coordinate positions of the control points by using formula (2).

4. The method according to claim 3, wherein the color mapping process $\xi$ is as follows: assuming that C is used to represent a colormap comprising n colors, wherein $C=\{C_1, C_2, \ldots, C_n\}$, $T=\{T_1, T_2, \ldots, T_n\}$, $0 \leq T \leq 1$ being used to represent numerical values of the two-dimensional scalar field data normalized to 0-1 that are arranged in ascending order, and C being assigned to an element with a same subscript in T.

5. The method according to claim 1, wherein in specific steps of the establishing an energy optimization equation for coordinate positions of the control points, the energy optimization equation comprises a weighted sum of a boundary term, a contrast term, and a fidelity term:

$$\arg \min_{\bar{p}} E(x;\bar{p}) = \alpha B(x;\bar{p}) + \beta F(x;\bar{p}) + \gamma V(x;\bar{p}); \quad (3), \text{ where}$$

x is the two-dimensional scalar field data for which mapping is performed, $\bar{p}$ is a to-be-optimized position of the control point, and $\alpha$, $\beta$, and $\gamma$ are weight parameters; $E(x; \bar{p})$ represents the energy optimization equation; $B(x; \bar{p})$ represents the boundary term; $F(x; \bar{p})$ represents the fidelity term; and $V(x; \bar{p})$ represents the contrast term.

6. The method according to claim 5, wherein the solving the energy optimization equation to obtain an optimized coordinate position of the control point specifically comprises the following steps:

performing sequential quadratic programming to solve the optimization function $\arg \min_{\bar{p}} E(x; \bar{p})$ iteratively, by using the coordinate position of the control point as a variable for optimization solution;

calculating the boundary term, wherein a function of the boundary term is to guarantee that boundary distribution of color mapping data is consistent with a hidden boundary structure of the two-dimensional scalar field data, and a boundary of the two-dimensional scalar field data refers to a change between different values;

calculating the fidelity term, wherein a function of the fidelity term is to guarantee a minimum difference between an optimized colormap and an initial colormap;

calculating a foreground-background contrast term, wherein a function of the contrast term is to guarantee a maximum contrast between a foreground color and a background color of the color mapping data, to enhance identifiability of the foreground data, thereby obtaining the optimized coordinate position of the control point.

7. The method according to claim 5, wherein the boundary term is defined as:

$$B(x;\bar{p}) = -\Sigma_i^M q(x_i) * \Sigma_{j \in \Omega} \|f(x_i;\bar{p}) - f(x_j;\bar{p})\|^2; \quad (4), \text{ where}$$

$B(x; \bar{p})$ represents the boundary term; and $q(x_i)$ represents a marginal likelihood function of the data point $x_i$; assuming that i is a label of any data point in the two-dimensional scalar field data, $x_i$ represents a numerical value of the data point; $\Omega$ represents a neighbor point of the current data point i, and M represents all data points in the two-dimensional scalar field; $f(x_i; \bar{p})$ represents mapping of a parameter value to a color value, for the data point $x_i$ and a set $\bar{p}$ of control point positions, a color mapping equation can be used to obtain a corresponding color value of the data point $x_i$; and $\|\cdot\|$ represents a Euclidean distance; and the fidelity term is defined as:

$$F(x; \bar{p}) = \sum_i^W \|\zeta(\bar{p}_i) - \zeta(p_i)\|^2, \text{ s.t. } 0 < \zeta'(\bar{p}_i) < \epsilon$$

wherein $\zeta$ is an arc length function corresponding to the initial colormap; $F(x; \bar{p})$ represents the fidelity term; $\zeta(\bar{p}_i)$ represents a numerical value corresponding to the optimized coordinate position of the control point on the arc length function, and $\zeta(p_i)$ represents a numerical value corresponding to the coordinate position of an initial control point on the arc length function; E represents a maximum range of a derivative of the arc length function, which is set to the maximum value of the arc length function by default; and the contrast term between the foreground and the background is defined as:

$$V(x; \bar{p}) = -\sum_i^M \Delta L(f(x_i; \bar{p}), C_b) * \frac{e^{-d(i,\tilde{i})}}{H(x_i)}$$

wherein the background refers to unwanted data defined by a user; and a background color is represented by a single color $C_b$.

8. An electronic device, comprising a memory, a processor, and a computer instruction stored in the memory and executable on the processor, when the computer instruction is executed by the processor, the steps of the method according to claim 1 being completed.

9. A non-transitory computer-readable storage medium configured to store a computer instruction, when the computer instruction is executed by a processor, the steps of the method according to claim 1 being completed.

10. A two-dimensional scalar field data visualization system based on colormap optimization, comprising:

an input module configured to: receive an initial colormap and two-dimensional scalar field data that are input; calculate key colors in the initial colormap, and set the key colors as control points;

a mapping module configured to calculate a linear interpolation between pairwise control points by using a piecewise linear function, to generate a colormap, and map the colormap to the two-dimensional scalar field data;

an energy optimization equation establishing module configured to establish an energy optimization equation for coordinate positions of the control points and the two-dimensional scalar field data for which mapping is performed, wherein the coordinate positions of the control points are numerical values between 0 and 1 obtained by normalizing index values in the colormap corresponding to the control points; and a visualization module configured to solve the energy optimization equation to obtain an optimized coordinate position of the control point, generate a new colormap by using the piecewise linear function and the optimized coordinate position of the control point, and map the new colormap to the two-dimensional scalar field data, to obtain a final visualization result.

* * * * *